Dec. 12, 1967  J. H. SEXSTONE ET AL  3,357,320
MULTIPLE FILTER ASSEMBLY APPARATUS
Filed Feb. 5, 1965  3 Sheets-Sheet 3
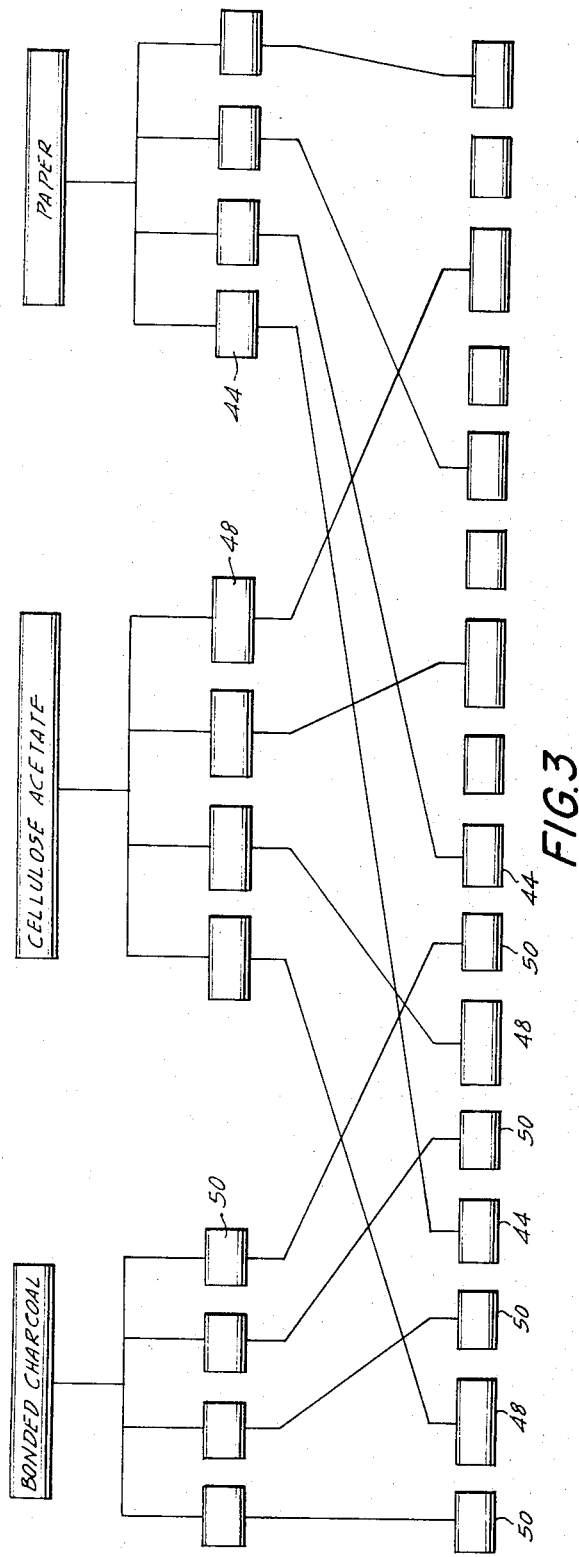
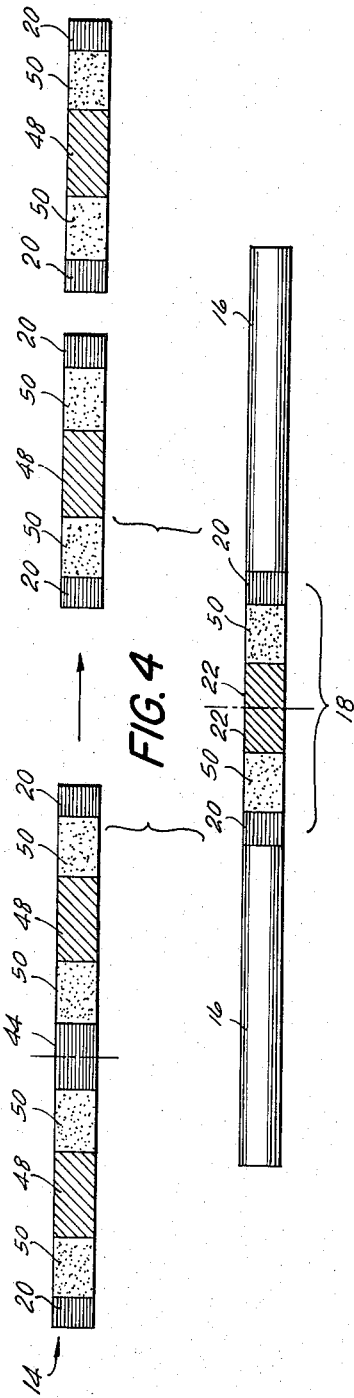
INVENTOR
JOHN H. SEXSTONE
MICHAEL B. HAGAN
BY
ATTORNEYS United States Patent Office 3,357,320
Patented Dec. 12, 1967

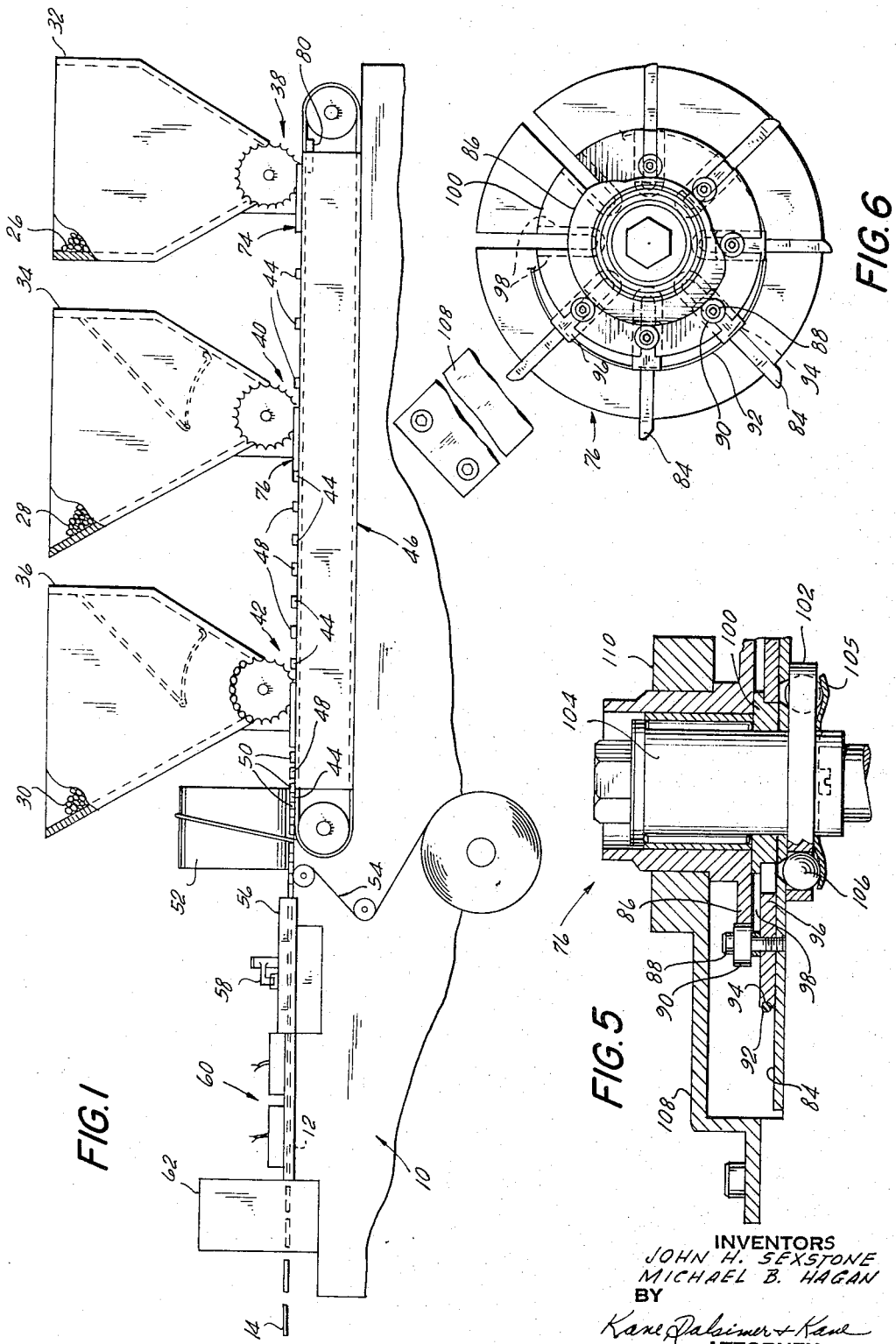

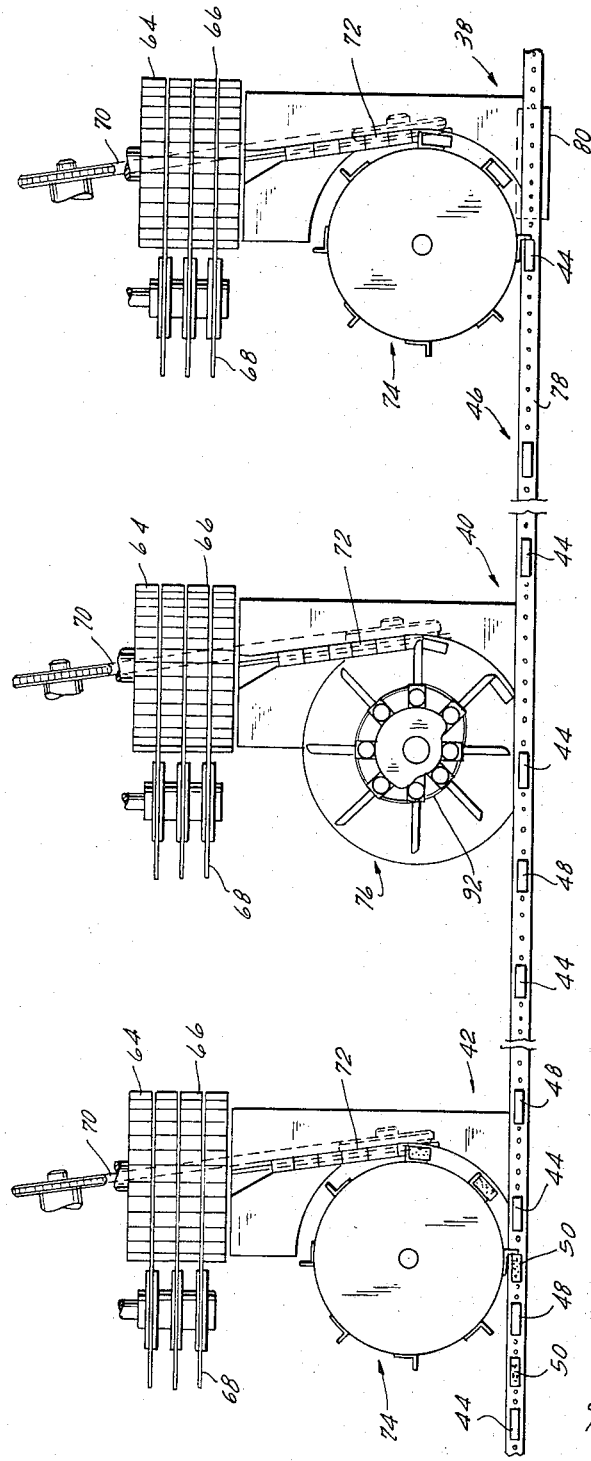

3,357,320
MULTIPLE FILTER ASSEMBLY APPARATUS
John H. Sexstone and Michael B. Hagan, Louisville, Ky., assignors to Brown & Williamson Tobacco Corporation, Louisville, Ky., a corporation of Delaware
Filed Feb. 5, 1965, Ser. No. 430,645
16 Claims. (Cl. 93—1)

ABSTRACT OF THE DISCLOSURE

A method and apparatus is provided for making composite cigarette mouthpiece rods which are divisible into mouthpieces having at least three filter sections. Components of one character are fed and conveyed in endwise and spaced relationship onto a moving conveyor. Components of a second character are similarly fed and conveyed and placed between the first components. A third component is similarly fed and conveyed and placed between the first and second components on the moving conveyor. The conveyor moves at a predetermined speed and the first and second components are fed thereto at one-half of this speed whereas the third component is fed at the conveyor speed. The feeder for the second component includes a series of rotatable pushers for moving these components and when the pusher has placed the components on the moving conveyor, they are retracted for purposes of avoiding contact with the first components. Thereafter, the components on the conveyor are placed in abutting relationship and, subsequently, wrapped and sub-divided into the desired lengths of rod.

---

This invention relates to the manufacture of multiple filters for cigarettes and, more particularly, to the assembly of a triple filter in one operation employing an "in-line" assembly operation.

In the cigarette industry a need has developed for a triple filter for purposes of conditioning the smoke stream through filtration and, possibly, the incorporation, elimination and/or modification of materials constituting the smoke stream. The use of charcoal and other adsorbents of the activated type particularly in granular form whether bonded or otherwise has increased significantly in the recent past thereby further contributing to the desirability of triple filters. An ever increasing demand exists, however, for apparatus capable of assembling components of a triple filter in one operation and in a continuous rod particularly by the utilization of an "in-line" principle of assembly.

An "in-line" multiple filter making machine is available to the industry and is known as Molins D.A.P.T.C. machine disclosed in substance in U.S. Patent No. 2,957,285 of Oct. 25, 1960. This machine, however, is capable of producing a two component multiple filter. The only manner of employing this particular machine in the manufacture of triple filters is through a two machine assembly operation.

It is, therefore, a principal object of this invention to provide an improved apparatus and technique for assembling multiple filters and particularly triple filters in one operation and as a continuous rod and in which one of the filter segments may include bonded granules of activated charcoal.

Generally speaking, the present invention proposes to adopt but modify the Molins D.A.P.T.C. machine to accomplish its objectives. A third filter segment hopper and feeding station amongst other structure is incorporated; and in order to permit the introduction of this third feed, the relative operation and speed of the plug section feeding stations has been critically controlled and timed to permit the free flow of the different filter sections onto a suction belt which transfers the filter sections to the wrapping station. Thus, the second of the three filter section feed stations includes a novel cam actuated filter segment feeder. The fingers of this feed move the segments at the second station onto the suction belt and, at the proper time, are retracted so as not to interfere with the travel of the segments deposited on the conveyor at the first filter segment feeding station. In connection with the latter station, means are incorporated in the form of a plate located at the discharge end of the first segment feeder to prevent the vacuum applied to the suction belt from disrupting the desired alignment and spacing of the first segments deposited on the suction belt.

Other objects and advantages will become apparent from the following detailed description which is to be taken in conjunction with the accompanying drawing illustrating a single somewhat preferred embodiment of the invention and in which:

FIG. 1 is a front elevational view of a multiple filter assembly apparatus of this invention;

FIG. 2 is an enlarged fragmentary top plan view of the apparatus showing the three filter segment feeding stations and interspersion of the segments in the contemplated "in-line" operation for subsequent wrapping and then cutting;

FIG. 3 is a diagrammatic view of the manner in which the segments are cut and interspersed for purposes of forming a continuous multiple filter rod of this invention;

FIG. 4 is an elevational view partly in section showing the manner in which a multiple filter rod of predetermined length is severed and associated with two cigarette lengths; whereupon the interposed double length multiple filter is subsequently severed to produce two filter cigarettes;

FIG. 5 is an enlarged fragmentary sectional view showing the retractable fingers of the filter segment feeder at the second station; and FIG. 6 is an enlarged top plan view of this second feeder.

In the drawings, the illustrated multiple filter assembly machine 10 is operable to produce a continuous length of composite filter rod 12 of material A, granular adsorbent, and material B formation which is then cut at predetermined intervals. The severed lengths 14 are adapted to be conveniently handled by filtertip attachment machinery which may be of the type adapted to assemble two cigarette lengths 16 interconnected by means of an interposed double length of multiple filter 18. In this manner, the present invention envisions a triple filter which, according to the specific and somewhat preferred embodiment, constitutes a paper section 20 next to the tobacco, a cellulose acetate section 22 at the mouth end of the filter and a bonded charcoal section 50 therebetween.

The multiple filter assembly machine 10 is adapted to process the length 14 of multiple filter segments from predetermined lengths of rod of paper 26 of cellulose acetate 28 and bonded charcoal 30 which are conveniently introduced by means of the respective hoppers 32, 34 and 36. These respective lengths are suitably cut and fed at the paper segment feeding station 38, the cellulose acetate feeding station 40 and the bonded charcoal segment feeding station 42 in a manner to be described. Suffice it to say at this time that the paper segments 44 are initially directed onto a suction belt 46 at spaced intervals and held thereon by suction. Cellulose acetate segments 48 are then interspersed between the paper segments 44 at the cellulose acetate segment feeding station 40. The charcoal segments 50 are then introduced between both of the spaced segments 44 and 48 at the charcoal segment feeding station 42.

A helical drum 52 driven in timed relationship with respect to the speed of the belt 46 closes the gap between the filter segments. The abutting filter segments are now arranged in line and are fed onto a traveling paper web 54. The paper web is then folded about the abutted segments by the folding device 56 and adhesive is applied by the paste applicator 58 which applies a strip of adhesive on the inside of the upper marginal side edge of the paper web. The wrapping of the paper web and formation of the seam is completed such that the overlapped side edges are adhesively secured to one another about the abutting filter segments. The wrapped filter rod 12 is, consequently, formed and then passed through the heating station 60 which serves to set and dry the applied adhesive. When thermoplastic wrapper material is utilized, a heater may be substituted for the seam paster 58 to secure the overlapping marginal side edges; and, under these circumstances, a heater similar to that employed at the heating station 60 will not be required. The resulting continuous composite rod is cut by the cut-off device 62 into the individual lengths 14 at which point the lengths are accelerated and spaced apart and then deflected sideways in a conventional manner.

The cut-off mechanism 62 is timed to cut the continuous rod 12. The cut lengths 14 are then subsequently placed in conventional filter tip attachment machinery alapted to secure composite mouthpieces on cigarettes.

Each of the feeding stations 38, 40 and 42 is provided with a feeding device comprising a drum 64 having flutes on its periphery and which is disposed at the bottom of the associated hopper for receiving the contained plug lengths in the flutes. The drum 64 is provided with a number of circumferentially extending grooves 66 into which rotating disc knives 68 extend so as to sub-divide each plug length into smaller separate individual segments. An endless chain conveyor 70 having pusher pieces is disposed beneath the drum 64 so that, as the drum rotates, a pusher piece enters a flute so as to remove the cut plug lengths in a substantial continuous line. A guide 72, associated with the trailing end of the chain conveyor 70, serves to elevate the individual plug lengths at which point a rotatable disc feeder also provided with pushers is adapted to feed the raised plug segments in an arcuate path on to the suction belt 46. With the exception of the disc feeder 74 at the second cellulose acetate segment station 40, the construction of the feeding stations 38, 40 and 42 may be similar and be of the type disclosed in U.S. Patent No. 2,957,285. It should be understood, however, that the disc feeder 74 at the first station 38 is traveling at a surface speed one-half of the speed of the belt 46. This is also true with the rate at which the disc feeder 76 feeds segments onto the belt 46. However, the disc feeder at the third station 42 is traveling at belt speed.

The suction belt 44 comprises a perforated suction conveyor band 78 and may be of the type present in the Molins D.A.P.T.C. machine. Similarly, the helical drum 52 may be of the type well known to the industry and the mechanisms located downstream therefrom may also be of the type present in the Molins D.A.P.T.C. machine and disclosed in U.S. Patent No. 2,957,285.

It has been found that, from time to time, the paper segments 44 have a tendency to either be misaligned on the garniture belt 46 due to the action of suction as they are fed by the disc feeder 74 or even be pulled onto the suction belt 46 by suction prematurely to affect the desired spacing between segments. In order to assure proper placement of the paper segments 44 on the suction belt, means in the form of a plate 80 at the leading end of the conveyor 46 and discharge end of the disc feeder 74 is incorporated into the machine. This plate 80 serves to prevent the suction from acting upon the paper segments until such time as the segments are properly disposed and aligned over the belt 46.

Reference is now made to the disc feeder 76. Inasmuch as this feeder travels at a rate approximately one-half that of the suction belt 46, its associated pushers will not be able to clear plugs from the disc feeder 74. Segments will be engaged thereby and become disarranged. Thus, to assure against undesirable contact of the pushers, the disc feeder 76 is provided with a like number if retractable fingers or pushers 84. In the extended position, these fingers are adapted to direct the cellulose acetate filter segments 48 onto the suction belt 46. In a retracted position, these fingers are withdrawn away from the conveyor 46 and the moving segments 44 thereon. The retraction will occur at a point where the fingers are unable to be encountered by the segments 44.

In order to extend at the desired time and withdraw when necessary, these fingers 84 operatively engaged with a cam 86. In this regard, the fingers support an upwardly extending stud 88 which includes at its upper end a cam bearing 90. A tensioned O-ring type of retaining band 92 disposed in a recess 94 provided in surfaces of the fingers urges the cam bearing 90 of each finger into engagement with the cam 86.

The fingers are suitably guided throughout their reciprocal movements. In this connection, each finger is provided with an enlargement 96 adapted to reciprocate within a slot 98 of a ring member 100. This ring member 100 rests on collar 102 keyed to the driveshaft 104 of the disc feeder 76. The drive is transferred from the collar 102 to the ring member 100 through an interposed ball bearing 106 retained by spring 105 and which functions as a ball clutch in that the drive relationship between these parts will be released upon the encounter of a predetermined restraining force upon the fingers while rotating due to possible jamming of the filter segments. In this manner, damage of the finger 84 is prevented.

A cam clamping bracket 108 is fixed at one end to the frame or chassis of the machine and, at the other end, conveniently embraces the cam 86 by means of the collar portion 110 adapted to be tensioned around surfaces of the cam to thereby maintain the cam stationary but adjustable when desired.

Thus, each of the segment feeding stations 38, 40 and 42 are adapted to convey to the suction belt 46 segments of filtering material at a predetermined rate of purposes of producing the continuous filter rod 12. As will be apparent to those skilled in the art, this rod may embrace a material A, bonded charcoal section and material B formation which, according to the specific embodiment disclosed herein, may constitute paper and cellulose acetate at either or both of the ends of the ultimately formed cigarette filter. In this connection, it should be understood that this invention contemplates a filter formation of material A, bonded charcoal granule section and material A arrangement. In addition, it should be understood that other granular adsorbents are contemplated by the invention such as granular alumina, silica gel and the like. Furthermore, a central filter segment of material C other than a granular adsorbent and which may be material A or B is embraced by this invention.

In accordance with successful applications of the present invention, triple filters have been assembled having a length of 20 mm. in which the filter segments were, respectively, 6, 8 and 6 mm. long. In addition, triple filters 25 mm. long have been produced in which the segments were, respectively, 8, 11 and 6 mm. long. Obviously, the length of triple filter and that of the individual segments can be varied over a wide range.

Of importance is the adaptation of existing machinery and consequent reduction in development time in introducing to the art apparatus capable of producing a triple filter in one operation by an "in-line" operation.

Thus, among others, the several aforenoted objects and advantages are most effectively attained. Although a single somewhat preferred embodiment of the invention has been disclosed and described in detail herein, it should be understood that this invention is in no sense limited thereby but is to be determined by that of the appended claims.

We claim:

1. A method of making composite cigaretter mouthpiece rods each of which comprises components of at least three different characters and each of which is divisible into mouthpieces having at least three filter sections, said method comprising the steps of:

feeding first components of one character to a first conveying station;

conveying the first components endwise and in spaced relation in line to a wrapping station;

feeding second components of a second character to a conveying station;

alternating the second components with the first components in an endwise relation and in the same line for conveyance to the wrapping station;

feeding third components of a third character to a third conveying station;

alternating the third components with the first and second components in endwise relation and in the same line for conveyance to the wrapping station, conveying the components to the wrapping station at a predetermined speed, feeding the first and second components to their respective conveying stations at one-half said predetermined speed, and feeding the third components to the third conveying station at said predetermined speed;

placing the first, second and third components being conveyed in abutting relationship end-to-end;

enclosing the abutted components in a continuous wrapper to form a continuous composite rod; and sub-dividing said continuous rod by cutting it at predetermined intervals and through predetermined components.

2. The invention in accordance with claim 1 wherein the continuous rod is sub-divided by cutting it only through components which are of a character required in that part of an individual composite mouthpiece which is to be located at the extreme mouthpiece end of a mouthpiece cigarette.

3. The invention in accordance with claim 1 wherein the first components are paper, the second components are cellulose acetate, and the third components are bonded activated charcoal.

4. The invention in accordance with claim 1 wherein the components are provided by cutting predetermined length rods following regulated discharge of such rods from hoppers prior to feeding.

5. The invention in accordance with claim 1 wherein the suction is applied to the segments to maintain them in endwise relation while being conveyed to the wrapping station and delaying the application of suction to the first components to assure a predetermined spaced and endwise relation.

6. The invention in accordance with claim 1 wherein said second components are fed to the second conveying station by pushers, rotating said pushers and simultaneously retracting said pushers at a predetermined point to clear first segments being conveyed to the wrapping station.

7. The invention in accordance with claim 1 wherein the segments are provided by being cut from rods prior to being fed to their respective conveying stations, the lengths of the first and second segments being double that of the respective sections present in the cigarette mouthpiece and the length of the third component being of a predetermined length and being the same as that of the respective section present in the cigarette mouthpiece.

8. Apparatus for making composite cigarette mouthpiece rods each of which comprises components of at least three different characters and each of which is divisible into mouthpieces having at least three filter sections, said apparatus comprising:

first feeding means for feeding first components of one character to be conveyed;

conveying means for receiving and conveying the first components endwise and in spaced relation in line to be wrapped;

second feeding means for feeding second components of a second character and alternating the second components with the first components in an endwise relation on the conveying means and in the same line;

third feeding means for feeding third components of a third character and alternating the third components with the first and second components in endwise relation on the conveying means and in the same line;

drive means being provided for driving the conveying means and the components thereon at a predetermined speed, the first and second feeding means such that the respective first and second components travel at one-half said predetermined speed, and the third feeding means such that the third component travels at said predetermined speed;

abutting means for placing the components being conveyed in abutting relationship end-to-end;

wrapping means for enclosing the abutted components in a continuous wrapper to form a continuous composite rod; and cutting means for cutting the rod at predetermined intervals and through predetermined components to form predetermined rod lengths.

9. The invention in accordance with claim 8 wherein each of said feeding means includes a hopper for containing predetermined length rods from which the respective components are cut, discharge and cutting means for discharging the predetermined length rods from the associated hopper and sub-dividing them into the said components, conveying means for conveying the cut components in an endwise manner therefrom and a feeding disc means having pusher fingers for engaging the individual cut components and directing them onto the conveying means.

10. The invention in accordance with claim 8 wherein said cutting means is timed to sub-divide the continuous rod by cutting only through components which are of a character required in that part of an individual composite mouthpiece which is to be located at the extreme mouthpiece end of a mouthpiece cigarette.

11. The invention in accordance with claim 8 wherein the first components are paper, the second components are cellulose acetate, and the third components are bonded activated charcoal.

12. The invention in accordance with claim 8 wherein the conveying means comprised a suction belt means for maintaining the segments in place and in endwise relation while being conveyed and delay means for delaying the application of suction to the first components to assure a predetermined spaced and endwise relation.

13. The invention in accordance with claim 8 wherein the lengths of the first and second segments being double that of the respective sections present in the cigarette mouthpiece and the length of the third component of a predetermined length and being the same as that of the respective section present in the cigarette mouthpiece.

14. A method of making composite cigarette mouthpiece rods each of which comprises components of at least three different characters and each of which is divisible into mouthpieces having at least three filter sections, said method comprising the steps of:

feeding first components of one character to a first conveying station;

conveying the first components end-wise and in spaced relation in line to a wrapping station;

feeding second components of a second character to a conveying station by pushers, rotating said pushers and simultaneously retracting said pushers at a predetermined point to clear first segments being conveyed to the wrapping station;

alternating the second components with the first components in an end-wise relation and in the same line for conveyance to the wrapping station;

feeding third components of a third character to a third conveying station;

alternating the third components with the first and second components in end-wise relation and in the same line for conveyance to the wrapping station;

placing the first, second and third components being conveyed in abutting relationship end-to-end;

enclosing the abutted components in a continuous wrapper to form a continuous composite rod; and sub-dividing said continuous rod by cutting it at predetermined intervals and through predetermined components.

15. Apparatus for making composite cigarette mouthpiece rods each of which comprises components of at least three different characters and each of which is divisible into mouthpieces having at least three filter sections, said apparatus comprising:

first feeding means for feeding first components of one character to be conveyed;

conveying means for receiving and conveying the first components end-wise and in spaced relation in line to be wrapped;

second feeding means for feeding second components of a second character and alternating the second components with the first components in an end-wise relation on the conveying means and in the same line;

third feeding means for feeding third components of a third character and alternating the third components with the first and second components in end-wise relation on the conveying means and in the same line;

each of said feeding means including a hopper for containing predetermined length rods from which the respective components are cut, discharge and cutting means for discharging the predetermined length rods from the associated hopper and sub-dividing them into the said components, conveying means for conveying the cut components in an end-wise manner therefrom and a feeding disc means having pusher fingers for engaging the individual cut components and directing them onto the conveying means, the feeding disc means of said second feeding means having retractable fingers and cam means for extending the fingers to engage the cut components and direct them onto the conveying means and retract the fingers to clear the conveying means and the components traveling thereon;

abutting means for placing the components being conveyed in abutting relationship end-to-end;

wrapping means for enclosing the abutted components in a continuous wrapper to form a continuous composite rod; and cutting means for cutting the rod at predetermined intervals and through predetermined components to form predetermined rod lengths.

16. Apparatus for making composite cigarette mouthpiece rods each of which comprises components of at least three different characters and each of which is divisible into mouthpieces having at least three filter sections, said apparatus comprising:

first feeding means for feeding first components of one character to be conveyed;

conveying means for receiving and conveying the first components end-wise and in spaced relation in line to be wrapped;

second feeding means for feeding second components of a second character and alternating the second components with the first components in an end-wise relation on the conveying means and in the same line;

third feeding means for feeding third components of a third character and alternating the third components with the first and second components in end-wise relation on the conveying means and in the same line;

drive means being provided for driving the conveying means and the components thereon at a predetermined speed, the first and second feeding means such that the respective first and second components travel at one-half said predetermined speed, and the third feeding means such that the third component travels at said predetermined speed, the feeding means of said second feeding means has retractable fingers and cam means for extending the fingers to engage the cut components and direct them onto the conveying means and retract the fingers to clear the conveying means and the components traveling thereon;

abutting means for placing the components being conveyed in abutting relationship end-to-end;

wrapping means for enclosing the abutted components in a continuous wrapper to form a continuous composite rod; and cutting means for cutting the rod at predetermined intervals and through predetermined components to form predetermined rod lengths.

References Cited

UNITED STATES PATENTS

| 2,915,069 | 12/1959 | Schur | 131—10.9 XR |
|---|---|---|---|
| 2,957,285 | 10/1960 | Molins | 93—1 |
| 3,131,612 | 5/1964 | Rowlands | 93—1 |
| 3,234,948 | 2/1966 | Stebbings | 131—10.9 |
| 3,251,365 | 5/1966 | Keith et al. | 131—10.9 |

BERNARD STICKNEY, *Primary Examiner.*